No. 664,945. Patented Jan. 1, 1901.
B. R. GUION.
SINK.
(Application filed Oct. 20, 1899.)
(No Model.) 2 Sheets—Sheet 1.
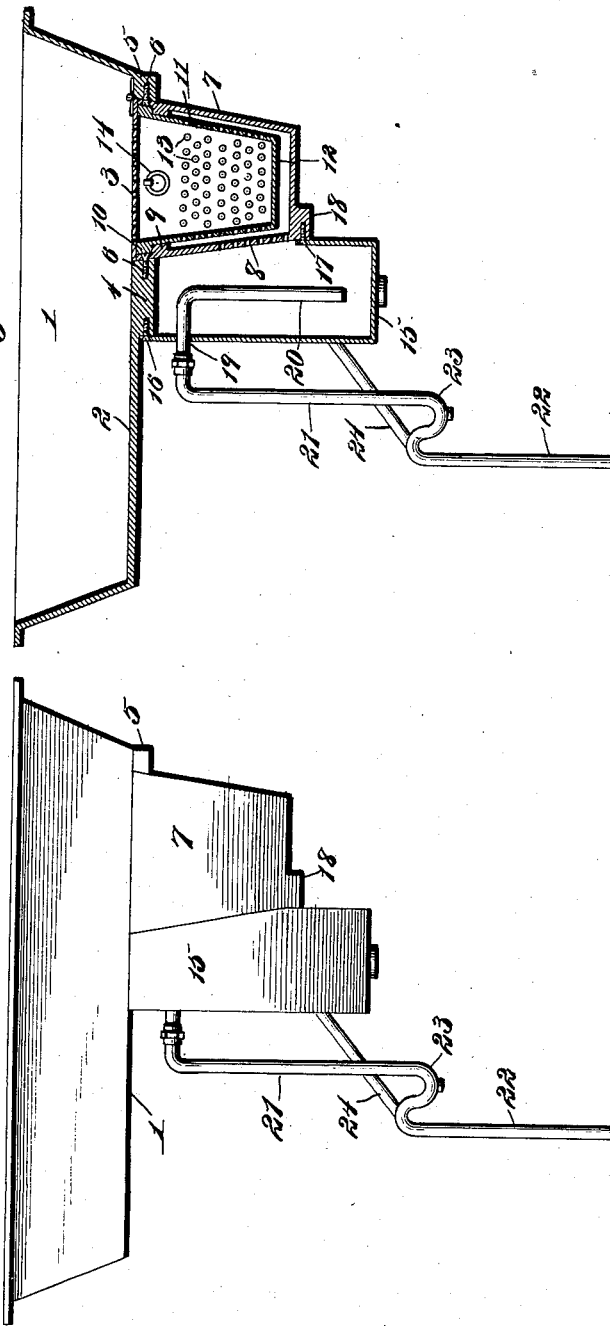
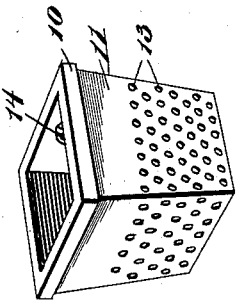
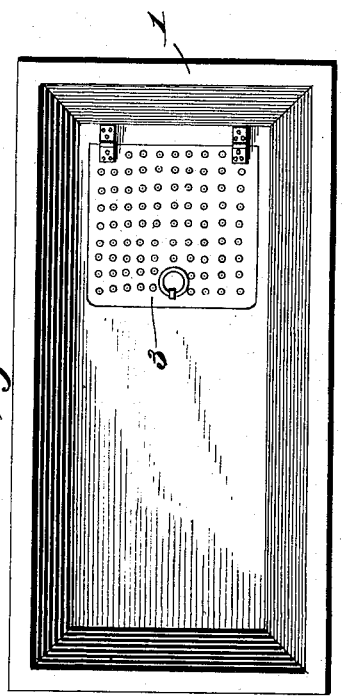
Witnesses
Louis D. Heinrichs.
F. O. McCleary.
Inventor
Barnard R. Guion
By Victor J. Evans.
Attorney No. 664,945. Patented Jan. 1, 1901.
B. R. GUION.
SINK.
(Application filed Oct. 20, 1899.)
(No Model.) 2 Sheets—Sheet 2.

Witnesses
Louis D. Heinrichs
F. V. McCleary

Inventor
Barnard R. Guion
By Victor J. Evans
Attorney

UNITED STATES PATENT OFFICE.

BARNARD R. GUION, OF NEW YORK, N. Y.

SINK.

SPECIFICATION forming part of Letters Patent No. 664,945, dated January 1, 1901.

Application filed October 20, 1899. Serial No. 734,247. (No model.)

*To all whom it may concern:*

Be it known that I, BARNARD R. GUION, a citizen of the United States, residing at New York, in the county of New York and State of New York, have invented certain new and useful Improvements in Sinks, of which the following is a specification.

My invention relates to sinks adapted primarily for use in kitchens, one object being to prevent the clogging or obstruction of sewer-pipes by collecting grease and other washings from dishes and cooking vessels within a suitable receiver, so that they cannot pass to the waste-pipe of the sink.

A further object of the invention is to prevent the escape of sewer-gas from the sink.

The construction of the improvement will be fully described hereinafter in connection with the accompanying drawings, which form a part of this specification, and the novel features thereof defined in the appended claim.

Figure 5:
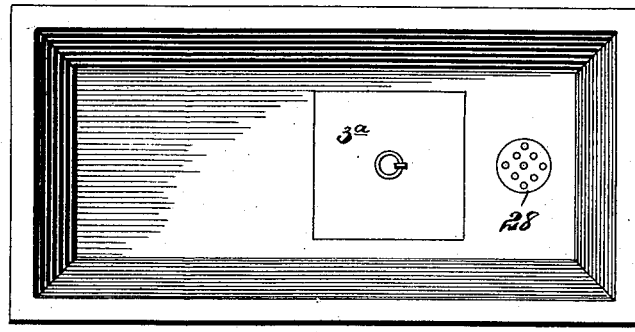
Figure 6:
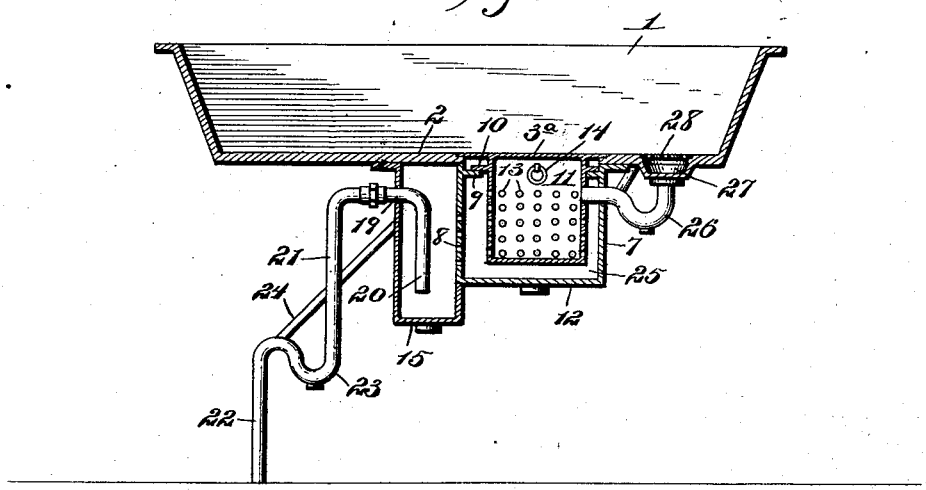

In the drawings, Figure 1 is a side elevation of a sink embodying the invention. Fig. 2 is a vertical section thereof. Fig. 3 is a top plan view. Fig. 4 is a view in perspective of the removable receiver of the sink, and Figs. 5 and 6 are respectively a plan view and a vertical section of a modification.

The reference-numeral 1 designates the casing or bowl of the sink, which may be of the usual rectangular form and provided at its bottom 2 with a discharge-opening closed by a hinged perforated cover or strainer 3. On the under surface of the bottom 2 are formed parallel transverse flanges 4 and 5, to which is secured by screws 6 the upper end of a casing 7, which is of rectangular form in cross-section and having its inner side 8 perforated to serve as a strainer. The casing 7 is formed on its inner surface and near its upper end with a continuous inwardly-projecting flange 9, which serves as a support for a flange 10, projecting from the upper end of a removable rectangular vessel 11, formed with an imperforate bottom 12 and perforated walls 13. The vessel 11 is also provided with rings 14 on opposite sides to facilitate its removal from the casing 7.

15 designates a receptacle open at one side and secured by screws 16 and 17 to the flange 4 and a flange 18, depending from the bottom of the casing 7. The open side of the receptacle 15 is closed by the perforated side 8 of the casing 7, as shown in Fig. 2.

19 designates a siphon, the short leg 20 of which extends down within the receptacle 15, while the long leg 21 of the siphon communicates with the waste-pipe 22, formed with a trap 23 and a pipe 24 leading to the outer air.

The receiver 11, as shown in Fig. 2, is of less cross-sectional area than the casing 7 to leave a space 25 between the receiver and casing.

The utility of the apparatus will be apparent from the above description in connection with the drawings. The water is started running from the faucet, and after a sufficient quantity to start the siphon has entered the receptacle 15 the faucet is closed and the receiver is emptied of water by the siphon. The hinged strainer 3 is then raised, and the contents of the receiver are emptied into a garbage-pail or like receptacle. The receiver is then rinsed and replaced within the casing 7, and the faucet is again turned on to allow the water to rise to a level with the lower part of the siphon. The faucet is then turned off and the strainer 3 closed, after which the vessel containing hot greasy water is emptied with the receiver. The contact of the cold water in the receiver with the hot grease causes the latter to coagulate upon the top of the water, and the siphon empties the water from the receiver, which will be again removed and its contents deposited in a pan for household use or for disposal as soap-fat.

It will be observed that the sink is trapped both by the receptacle 15 and the trap 23, thus forming a double seal against the upward escape of sewer-gas.

The construction shown in Figs. 5 and 6 differs from that shown in the other figures by the interposition of a trap 26 between the casing 7 and the adjacent end of the sink-bowl 1, communicating with an outlet-opening 27, covered by a perforated cover 28. In this construction the cover 3ª of the receiver is made imperforate, as shown in Fig. 5, and the casing 7 and receptacle 15 may be formed integral, as shown.

I claim—

In a device of the character described, the combination, with a sink-bowl; of a perforated casing depending therefrom; a flange within the casing near the upper end thereof; a perforated receiver depending from, and supported by, said flange; handles within the receiver; a receptacle extending from the bottom of the casing to the sink-bowl, said bowl having an opening therein; a strainer closing the opening; a trap connecting said opening and the perforated receiver; and a siphon the short leg of which extends down within the receptacle while the long leg communicates with a waste-pipe.

In testimony whereof I affix my signature in presence of two witnesses.

BARNARD R. GUION.

Witnesses:
ALEXANDER LUTZ,
WALTER E. BROWN.